July 16, 1929.  W. E. DAVISON ET AL  1,721,003
FISHING TOOL
Filed Jan. 16, 1926

INVENTORS:
WILLIAM E. DAVISON,
WILLIAM B. MARSHALL,
BY
ATTORNEY.

Patented July 16, 1929.

1,721,003

UNITED STATES PATENT OFFICE.

WILLIAM E. DAVISON AND WILLIAM B. MARSHALL, OF FELLOWS, CALIFORNIA.

FISHING TOOL.

Application filed January 16, 1926. Serial No. 81,609.

Our invention relates to the oil well drilling industry and it relates particularly to a novel form of fishing tool which is for the purpose of removing pieces of equipment which have been lost in a well.

In the drilling of wells it often occurs that tools or portions thereof become lost in the hole and the presence thereof makes further drilling impossible, and it is common practice to remove the lost tools from the hole by use of a fishing tool so that drilling may be continued.

It is an object of this invention to provide a fishing tool by means of which lost articles such as tools or portions thereof may be removed from the well in a minimum time and with a minimum amount of labor.

It is a further object of the invention to provide a fishing tool having jaws which may be reset in the well, not having to be elevated to the surface of the ground to be reset.

A further object of this invention is to provide a fishing tool having means for positively moving the jaws into engagement with the lost article which operation of the jaws is accomplished by a rotation of the drill pipe.

It is also an object of the invention to provide a fishing tool having jaws which are capable of and which may be operated to engage an article either externally or internally.

It is another object of this invention to provide a fishing tool having jaws which are resiliently held in engagement with a lost article until these jaws are brought into positive engagement therewith.

Other objects and advantages of the invention will be made evident in the following description and drawings.

Referring to the drawings in which we illustrate alternative forms of our invention:

Figure 1:
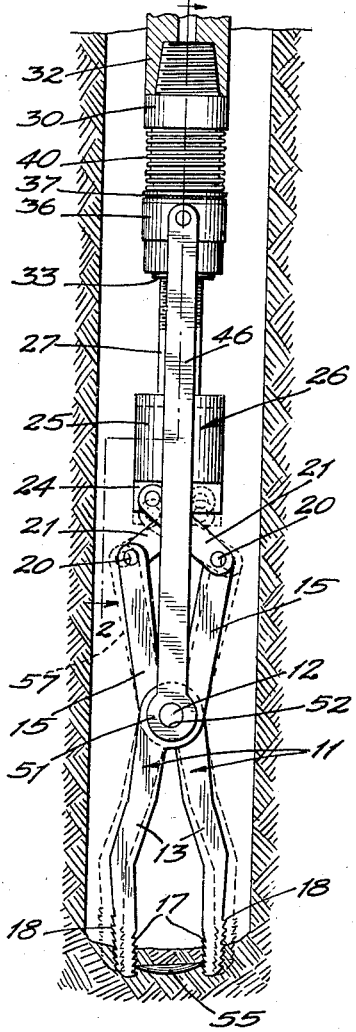
Fig. 1 is an elevational view of a fishing tool of our invention.
Figure 4:
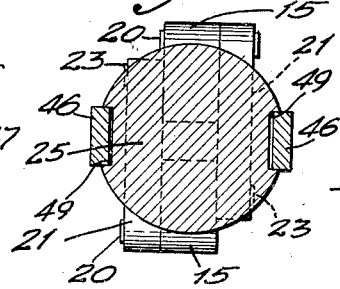
Fig. 4 is a section taken on the line 4—4 of Fig. 2.

Referring to Figs. 1 to 4 inclusive, the first form of our invention has a pair of jaw members 11 which is hingedly secured together by a hinge pin 12. The jaw members 11 are in the form of jaws 13 which comprise the lower portions of the jaw members 11, and extensions 15 which comprise the upper portions of the jaw members 11. The jaws 13 may be provided with internal teeth 17 and also external teeth 18. Pivot pins 20 are provided for the purpose of pivotally attaching links 21 to the extreme upper ends of each of the extensions 15. The links 21, as illustrated in Figs. 1 and 4, cross each other and the upper ends thereof are pivotally attached by pivot pins 23 to a tongue 24. The tongue 24 depends from a block 25 of a jaw operating member 26. The links 21 and the jaw operating member 26 comprise the jaw operating mechanism of the invention.

The jaw operating member 26 has a threaded stem 27 which extends upward from the block 25, and it is screwed into a threaded cavity 28 of a head 30. The head 30 is provided with a threaded pin 31 by means of which the fishing tool may be attached to a tool joint 32 which is usually provided in the lower end of a string of drill pipe, the string of drill pipe not being shown.

The head 31 has a sleeve 33 which is preferably an integral part thereof, on the lower end of which a nut 34 is threadably secured. Surrounding the sleeve 33 above the nut 34 is a collar 36. Directly above the collar 36 and surrounding the sleeve 33 is a bearing 37 having a lower race member 38, which engages an upper face of the collar 36, and an upper race 39 which is engaged by a spring 40 which surrounds the sleeve 33. The upper end of the spring 40 engages an annular shoulder 41 formed by the head 30 at the upper end of the sleeve 33. Balls 42 are placed between the race members 38 and 39. The spring 40 places a resilient pressure against the bearing 37 which in turn presses against the collar 36 and tends to hold it in its lowermost position on the sleeve 33 in which position the collar 36 engages an upper face of the nut 34. Surrounding the upper portion of the sleeve 33 is a spacer 44 which acts as a stop means and controls the uppermost position of the collar 36 on the sleeve 33. When the collar 36 is in its uppermost position, the upper race 39 of the bearing 37 is in engagement with the lower end of the spacer 44. The spacer 44 may be of different lengths to allow whatever movement of the collar 36 on the sleeve 33 may be desired. The function of this movement will be explained hereinafter.

Connected to the collar 36 is a connecting means in the form of a pair of straps 46. The upper ends of these straps 46 are secured to the collar 36 by means of pins 47 which project through openings 48 formed in the straps 46. These straps 46 extend downward through guide channels 49 which are formed vertically in opposite sides of the block 25 of the jaw operating member 26, and the lower ends of the straps 46 are provided with enlarged portions 51 having openings 52 by means of which the straps 46 are connected to the hinge pin 12.

The operation of this form of our invention is substantially as follows.

In Fig. 1 we have illustrated the fishing tool as gripping an article 55 which, for example, may be a disc of a disc bit. While the fishing tool is still at the surface of the ground the parts are positioned so that the distance between the jaws 13 conforms to the size of the article 55 being fished. The distance between the jaws 13 is determined by the position of the jaw operating member 26. The jaw operating member 26 may be moved relatively to the head 30 by rotating the head 30, thus advancing the threaded stem 27 either into or out of the threaded cavity 28. When the jaw operating member 26 is moved downward, the extensions 15 of the jaw members 11 are swung outward and consequently the jaws 13 of the jaw members 11 are swung outward and are spread apart. When the jaw operating member is moved upward, the extensions 15 are swung inward and the jaws are closed. After the jaws 13 have been set to approximately the right size, the fishing tool is lowered to the bottom of the well. When the lower ends of the jaws 13 strike the bottom of the well, the head 30, since the weight of the drill pipe is placed thereon, tends to continue to move downward. The collar 36, since it is attached to the jaw members 11 by means of the hinge pin 12, is held from downward motion and the sleeve 33 slides downward inside of it. This action compresses the spring 40 until the upper bearing race 39 engages the lower end of the spacer 44. A downward movement of the head 30 relative to the jaw members 11 causes the jaw operating member 26 to move downward relatively to the jaw members 11 and the jaw members 11 are thus swung into positions indicated by dotted lines 57 in Fig. 1. The jaws 13, as will be seen, are spread and it is intended that they should extend on either side of the article 55. The drill pipe is elevated and the head 30 and jaw operating member 26 will move upward relative to the jaw members 11, thus returning these members into the positions shown in full lines in Fig. 1. If the jaws 13 are extended to either side of the article 55, they will at this time have been moved into resilient engagement with the article 55. If it is found that the paws have properly engaged the article 55, the jaws may be brought into positive engagement therewith by rotating the drill pipe which causes the head 30 to rotate therewith. This pulls the jaw operating member 26 upward and will move the members 11, the straps 46 and the collar 36 upward therewith relatively to the head 30 until the upper race 39 of the bearing 37 engages the lower end of the spacer 44. When this engagement is made, the jaws 13 will be caused to positively and rigidly engage the article 55 so that it cannot be displaced when it is being elevated to the surface of the ground.

As previously mentioned, our invention is also useful for engaging articles having exposed internal faces. For example, sometimes a lower joint of drill pipe will be disconnected or twisted from the upper part thereof and this drill pipe must be removed before drilling operations can be continued. In this case, it is desirable to engage the internal face of the drill pipe so that it may be elevated to the surface of the ground. The jaw members 11 may be adjusted to such a position that the jaws 13 will be very close together, this being done by raising the jaw operating member 26 relatively to the head 30. The fishing tool is then lowered so that the jaws 13 extend inside the upper end of the lost drill pipe. The drill pipe and head 30 of the fishing tool are then rotated so that the jaw rotating member 26 is lowered relatively to the head 30. This spreads the jaws 13 of the jaw members 11 and brings the outer teeth 18 thereof into positive and gripping engagement with the inner face of the drill pipe.

Figure 5:
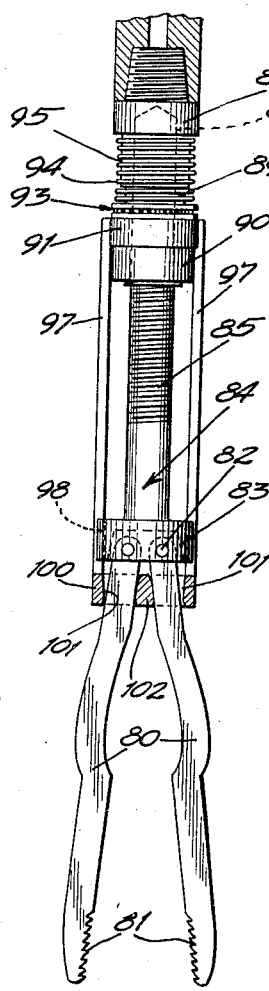
Fig. 5 is an elevational view of an alternative form of this invention.
Figure 2:
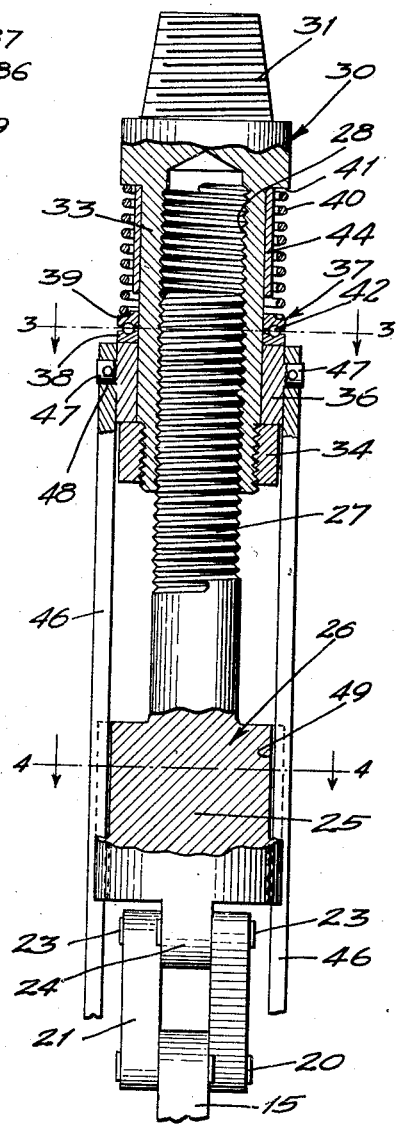
Fig. 2 is an enlarged partially sectioned view taken on the line 2—2 of Fig. 1.
Figure 3:
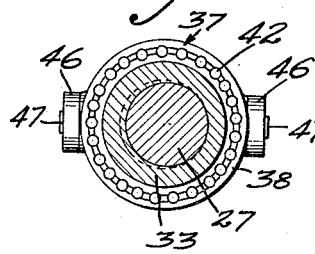
Fig. 3 is a section taken on the line 3—3 of Fig. 2.

In Fig. 5 we show an alternative form of our invention. This form of our invention has a pair of jaw members 80 having jaw teeth 81 provided at the lower end thereof. The upper ends of these jaw members 80 are hingedly secured by hinge pins 82 to a block 83 of a jaw operating member 84. The jaw operating member 84 also includes a threaded stem 85 which extends upward from the block 83 and is screwed into a threaded cavity 86 formed in a head 87. The head 87 has a sleeve 89 on the lower end of which a nut 90 is secured and which carries a collar 91, a bearing 93, a spring 94 and a spacer 95, the head construction and parts being the same as in the first form of our invention. Connected to the collar 91 and extending downward therefrom are connecting means in the form of straps 97. The straps 97 extend through guide channels 98 formed in opposite sides of the block 83 and are joined to a spreader block 100. The spreader block 100 has a pair of openings 101 which are separated by a spreading wedge 102, through which openings 101 the jaw members 80 extend. As is obvious from Fig. 5, when the jaw operating member 84 is raised relatively to the head 87 the jaws 80 are moved upward relatively to the spreader block 100 and are therefore constricted. The operation of the collar 91 and associated parts for providing a resilient gripping of the jaw members 81 is the same as the first form of our invention and it is thought that a description of its operation is not necessary.

Our invention broadly resides in the means for causing jaw members of a fishing tool to positively engage an article which has been previously resiliently engaged by the jaws. This is a very important feature and is accomplished by providing the jaw operating member which may be raised or lowered relatively to the head of the fishing tool. The means for prividing resilient engagement of the jaws with an article being fished is very desirable, since it assures that the article will be at least retained until the jaws may be caused to positively engage it.

From the description it is quite evident that the distance between the jaws may be varied merely by rotating the drill pipe and therefore the jaws may be repositioned without elevating the fishing tool from the lower end of a well, this being necessary in quite a few types of fishing tools. Another important feature of this invention is that the fishing tool is comparatively simple in construction and therefore the parts may be ruggedly designed so that they will withstand grief.

We claim as our invention:

1. In a fishing tool the combination of: a pair of jaw members; means for hinging said jaw members together; a head; a collar movable on a sleeve portion of said head; connecting means operatively connecting said collar and said jaw members; a spring for resiliently holding said collar in its lowermost position on said sleeve; and jaw operating mechanism connected to said head and said jaw members whereby the jaws thereof are opened or closed when said head is rotated relatively to said jaw members.

2. In a fishing tool the combination of: a pair of jaw members; means for hinging said jaw members together; a head; a collar movable on a sleeve portion of said head; connecting means operatively connecting said collar and said jaw members; a spring for resiliently holding said collar in its lowermost position on said sleeve; a pair of links each being pivoted to an extension of each of said jaw members; and a jaw operating member to which said links are pivoted, said jaw operating member being connected to said head in such a manner that same will be moved vertically when said head rotates relatively to said jaw members.

3. In a fishing tool the combination of: a pair of jaw members; means for hinging said jaw members together; a head; a collar movable on a sleeve portion of said head; connecting means operatively connecting said collar and said jaw members; a spring for resiliently holding said collar in its lowermost position on said sleeve; a pair of links each being pivoted to an extension of each of said jaw members; and jaw operating member to which said links are pivoted, said jaw operating member having a threaded stem which is screwed into a threaded cavity of said head so that said jaw operating member will be moved vertically when said head rotates relatively to said jaw members.

4. In a fishing tool the combination of: a pair of jaw members; means for hinging said jaw members together; a head; a collar movable on a sleeve portion of said head; connecting means operatively connecting said collar and said jaw members; a nut secured to the lower end of said sleeve and being engaged by said collar when said collar is in lowermost position; a spring for resiliently holding said collar in its lowermost position on said sleeve; and jaw operating mechanism connected to said head and said jaw members whereby the jaws thereof are opened or closed when said head is rotated relatively to said jaw members.

5. In a fishing tool the combination of: a pair of jaw members; means for hinging said jaw members together; a head; a collar movable on a sleeve portion of said head; connecting means operatively connecting said collar and said jaw members; a nut secured to the lower end of said sleeve and being engaged by said collar when said collar is in lowermost position; a spring for resiliently holding said collar in its lowermost position on said sleeve; a pair of links each being pivoted to an extension of each of said jaw members; and a jaw operating member to which said links are pivoted, said jaw operating member being connected to said head in such a manner that same will be moved vertically when said head rotates relatively to said jaw members.

6. In a fishing tool the combination of: a pair of jaw members; means for hinging said jaw members together; a head; a collar movable on a sleeve portion of said head; connecting means operatively connecting said collar and said jaw members; a nut secured to the lower end of said sleeve and being engaged by said collar when said collar is in lowermost position; a spring for resiliently holding said collar in its lowermost position on said sleeve; a pair of links each being pivoted to an extension of each of said jaw members; and a jaw operating member to which said links are pivoted, said jaw operating member having a threaded stem which is screwed into a threaded cavity of said head so that said jaw operating member will be moved vertically when said head rotates relatively to said jaw members.

7. In a fishing tool the combination of: jaw means; screw means for actuating said jaw means; and resilient means connecting said jaw means and said screw means so that said jaw means may be actuated by said screw means to yieldingly engage a fish.

8. In a fishing tool, the combination of: jaw members; a spring operatively connected to said jaw members to resiliently force same into engaging relationship with a body being fished for; a head; and means for rotating said head to compress said spring until said spring is inoperative to resiliently hold said jaw members in engaging relationship with said body.

9. In a fishing tool, the combination of: jaw members; a spring operatively connected to said jaw members to resiliently force same into engaging relationship with a body being fished for; a head; means for rotating said head to compress said spring; and a stop means for limiting the compression of said spring to change the resilient engagement between said jaw members and said body into a positive engagement.

10. In a fishing tool, the combination of: jaw members; a spring operatively connected to said jaw members to resiliently force same into engaging relationship with a body being fished for; and means for rendering said spring inoperative and thereby changing the resilient engagement between said jaw members and said body into a positive engagement.

11. In a fishing tool, the combination of: a head; a pair of jaw members; a jaw-operating member threadedly connected to said head; connecting means operatively connecting said head and said jaw members whereby any relative movement between said head and said jaw-operating member causes a movement of said jaws; and a spring operating against said connecting means to resiliently hold between said jaw members a body being fished for, said spring being compressible by a rotation of said head relative to said jaw-operating member to change the resilient engagement between said body and said jaw members into a positive engagement.

12. A combination as defined in claim 8 including a jaw-operating mechanism permitting said jaw members to spread against the action of said spring when said jaw members move against said body.

13. A combination as defined in claim 11 in which said jaw-operating member and said jaw members are connected together by links to permit said jaw members to expand against the action of said spring when said jaw members are moved against said body.

14. In a fishing tool, the combination of: a pair of jaw members; a jaw-operating member operatively connected to said jaw members; a head, any movement of said head relative to said jaw-operating member actuating said jaw members; teeth on the inside of said jaw members for engaging an exterior surface of a body being fished for; and teeth on the outside of said jaw members for engaging an interior surface of such a body.

15. A combination as defined in claim 1 including a bearing between said spring and said collar to permit an easy rotation therebetween.

16. A combination as defined in claim 1 including a spacer adjacent said sleeve portion of said head for limiting the compression of said spring.

In testimony whereof, we have hereunto set our hands at Fellows, California, this 6 day of January, 1926.

WILLIAM E. DAVISON.
WILLIAM B. MARSHALL.